(12) United States Patent
Pall et al.

(10) Patent No.: US 10,469,351 B2
(45) Date of Patent: *Nov. 5, 2019

(54) METHOD AND SYSTEM FOR CALCULATING LATENCY IN A DATA FLOW

(71) Applicant: InMobi PTE LTD, Singapore (SG)

(72) Inventors: Inderbir Singh Pall, Bangalore (IN); Sharad Agarwal, Bangalore (IN)

(73) Assignee: INMOBI PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,892

(22) Filed: Jul. 6, 2018

(65) Prior Publication Data

US 2018/0316585 A1    Nov. 1, 2018

Related U.S. Application Data

(63) Continuation of application No. 14/593,336, filed on Jan. 9, 2015, now Pat. No. 10,063,441.

(30) Foreign Application Priority Data

Jan. 9, 2014    (IN) .............................. 105/CHE/2014

(51) Int. Cl.
*H04L 12/26* (2006.01)

(52) U.S. Cl.
CPC ........ *H04L 43/0852* (2013.01); *H04L 43/106* (2013.01); *H04L 43/062* (2013.01)

(58) Field of Classification Search
CPC .. H04L 43/0852; H04L 43/106; H04L 43/062
See application file for complete search history.

(56) References Cited

U.S. PATENT DOCUMENTS

| | | | | |
|---|---|---|---|---|
| 2007/0064715 A1* | 3/2007 | Lloyd | ................. | H04L 41/0816 370/401 |
| 2011/0264822 A1* | 10/2011 | Ferguson | ................ | H04L 45/00 709/235 |
| 2013/0343390 A1* | 12/2013 | Moriarty | ............. | H04L 43/0852 370/392 |

* cited by examiner

*Primary Examiner* — Melvin C Marcelo

(57) ABSTRACT

The present invention provides a system for calculating latency in a distributed data flow environment. The system includes a plurality of hop servers and a central registry server. The plurality of hops servers is configured to receive a plurality of data packets across a time window, bucket each of the data packets of the plurality of data packets received across the time window into one or more buckets and transmit count of the plurality of the data packets in the one or more buckets and a window identifier associated with the time window to the central registry server. Each of the data packet of the plurality of data packets includes a header. The central registry server is configured to receive a plurality of counts and a plurality of window identifiers, to receive a latency query and to calculate latency.

18 Claims, 4 Drawing Sheets

METHOD AND SYSTEM FOR CALCULATING LATENCY IN A DATA FLOW

FIELD OF INVENTION

The present invention relates to a distributed computing system and in particular, it relates to calculating latency in the distributed computing system.

BACKGROUND

In the past few years, grid computing has shown a tremendous growth in the computer industry. Grid computing is a form of a distributed computing system in which numerous users share computing resources. The grid computing expedites selection, aggregation, and sharing of the computing resources across multiple hops (or nodes) over a diverse geographic area and across multiple networks. The sharing may be based on availability, capability, and cost of the computing resources available in the grid as well as on a user's quality of service requirements and the user's functional demands. Grid computing is growing in popularity to address the growing demands of processing power and capability.

In order to meet the growing demand of processing and a high performance in the distributed computing system, it is increasingly becoming critical to minimize latency between the multiple nodes. Latency in the network increases the possibilities of having bottlenecks at different hops in the grid due to factors, external to the system like network timeouts, CPU/memory bottlenecks and so forth. Latency also increases the packet loss in the network. Therefore, minimizing latency in the distributed system can result in aggregated and improved efficiency of computing, data, and storage resources.

In common approach, systems try to minimize latency in a packet-to-packet transmission. Such approach is expensive in terms of both space and time. In a conventional approach, systems attempt to minimize latency by synchronizing data packets only on source and destination clocks. Accordingly, these systems do not provide the functionality necessary to optimize and minimize system latency between remotely operating computing devices. In another conventional approach, a data stream is modified to include a time stamp synchronized to a common clock. This method is also intrusive and can delay distribution of the data stream.

In light of the above discussion, there is a need for a method and system, which overcomes all the above stated problems.

BRIEF DESCRIPTION OF THE INVENTION

The above-mentioned shortcomings, disadvantages and problems are addressed herein which will be understood by reading and understanding the following specification.

In embodiments, the present invention provides a system for calculating latency in a distributed data flow environment. The system includes a plurality of hop servers and a central registry server. The plurality of hops servers is configured to receive a plurality of data packets across a time window, bucket each of the data packets of the plurality of data packets received across the time window into one or more buckets and transmit a count of the plurality of the data packets in the one or more buckets and a window identifier associated with the time window to the central registry server. Each data packet of the plurality of data packets includes a header. The central registry server is configured to receive a plurality of counts and a plurality of window identifiers, to receive a latency query and to calculate latency based on the plurality of counts and the plurality of window identifiers.

In an embodiment, the plurality of hop servers includes one or more data agents. Each data agent of the one or more data agents is configured to parse the header of the each data packet of the plurality of data packets.

In an embodiment, the header of each data packet of the plurality of data packets includes a timestamp at which the each data packet of the plurality of data packets originated.

In another aspect, the present invention provides a method for transmitting data packet information to calculate latency over a distributed data flow environment. The method includes receiving a plurality of data packets across a time window, bucketing each of the data packets of the plurality of data packets received across the time window into one or more buckets each of the data packet of the plurality of data packets, and transmitting a count of the plurality of the data packets in the one or more buckets and one or more identifiers of the time window to a central registry server. Each of the data packets of the plurality of data packets includes a header.

In an embodiment, the header of each data packet of the plurality of data packets includes a timestamp at which each data packet of the plurality of data packets originated.

In yet another aspect, the present invention provides a method of calculating latency in a distributed data flow environment. The method includes receiving a plurality of counts and one or more identifiers of a time window from a plurality of hop servers, receiving a latency query, and calculating latency. The plurality of counts indicates a plurality of data packets in one or more buckets. Each of the one or buckets comprises a plurality of data packets grouped together based on a header of each of the data packets from the plurality of the data packets. Latency is calculated based on the one or more buckets and the one or more identifiers of the time window.

In an embodiment, the header of each data packet of the plurality of data packets includes a timestamp at which the each data packet of the plurality of data packets originated.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
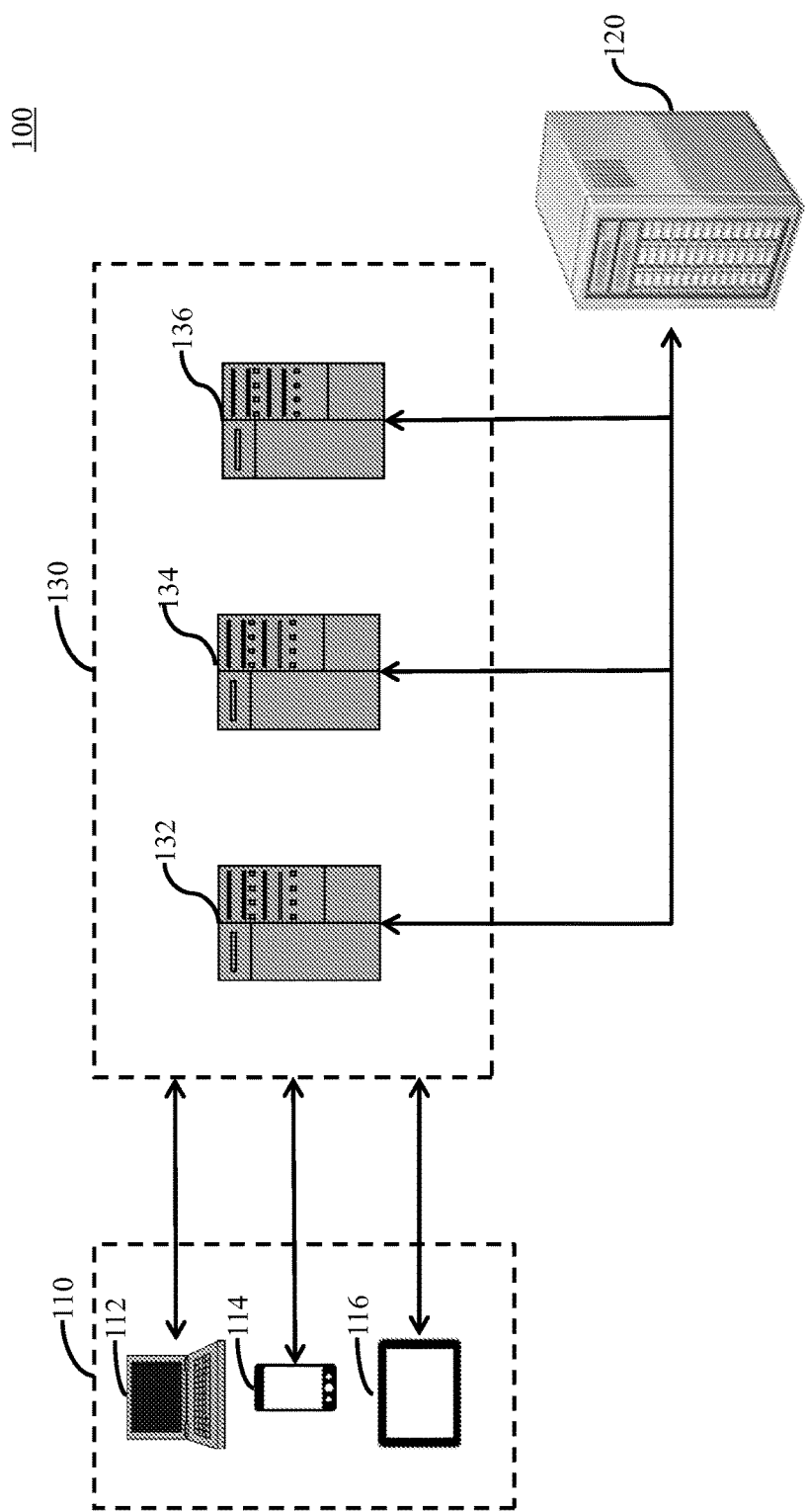
FIG. 1 illustrates a distributed computing system for calculating latency in a distributed data flow environment, in accordance with various embodiments of the present invention.

FIG. 1 illustrates a distributed computing system 100 for calculating latency in a distributed data flow environment, in accordance with various embodiments of the present invention.

The distributed computing system 100 includes a plurality of application servers 130. The plurality of the application servers 130 includes an application server 132, an application server 134 and an application server 136, as shown in FIG. 1. The plurality of the application servers 130 follows a grid computing architecture. The grid computing architecture is an approach in which a collection of loosely coupled, heterogeneous and geographically dispersed computer resources (or nodes) are coupled in a grid, to reach a common goal. The plurality of application servers 130 receives a plurality of requests from various nodes in the grid. The plurality of the application servers 130 is a part of the grid. The various nodes of the grid include a plurality of event generators 110.

In an embodiment, the application server 132 of the plurality of the application servers 130 is an advertisement server. The advertisement server is a web server used in online marketing to deliver advertisements (referred to as "ads" from herein) to a user. The advertisement server generates ads and distributes the ads using multiple data streams to multiple locations. Additionally, the advertisement server performs tasks such as counting a number of impressions for the ads, etc. The number of impressions for the ads is calculated based on the number of clicks that the ads receive.

Functions and capabilities of the application server 132 are same as the functions and the capabilities of an application server 134 and an application server 136.

In a context of the present invention, a plurality of event generators includes a mobile device 112, a mobile device 114, and a mobile device 116. The mobile device 112 communicates with the application server 132 in the distributed computing system 100. A plurality of the data packets generated on the mobile device 112 are transmitted from the mobile device 112 to the application server 132. Examples of the mobile device 112 include but may not be limited to, a cell phone, a smart phone, a personal digital assistant (PDA), a wireless email terminal, a laptop, a desktop computer, and a tablet computer.

In a context of the present invention, the plurality of the data packets received by the application server 132 is transmitted to other application servers of the plurality of the application servers 130 in a pipeline. The pipeline is a set of data processing units connected in series (or parallel), where an output of one unit is an input of a next unit. In a context of the present invention, the plurality of the application servers 130 is in one or more pipelines. Each of the plurality of the application servers 130 processes the plurality of the data packets received from a previous application server of the plurality of the application servers 130.

In a context of the present invention, the application server 132 includes a data agent. The data agent collects one or more data packets of the plurality of the data packets coming from the various nodes of the distributed computing system 100. The data agent processes the collected data and transmits the collected plurality of the data packets to the application server 134. Similarly, a data agent of the application server 134 collects the plurality of the data packets, processes the plurality of the data packets and transmits the plurality of the data packets to the application server 136.

In the embodiment discussed above, the advertisement server receives the impression and a clickstream from the mobile device 112. The clickstream is a record of the user's activity on the Internet. In an embodiment, the clickstream is recorded on a web browser of the mobile device 112. The advertisement server generates reports based on the impression and the clickstream for the ads. The reports determine return on investment (ROI) for an advertiser. A data analysis system is used in conjunction with the clickstream to build business intelligence The examples of the data analysis systems include but are not limited to data mining, online analytical processing (OLAP), multidimensional online analytical processing (MOLAP), relational online analytical processing (ROLAP), and a column-oriented database management system (DBMS).

In the embodiment discussed above, the mobile device 112 receives the ads from the advertisement server. In an embodiment, a user associated with the mobile device 112 views the ads while browsing a website. In another embodiment, the user views the ads on an application installed on the mobile device 112. The user, based on interest, clicks on the ads. The clickstream is a record of user information like user's Internet protocol (IP) address, a time stamp of the click, information of the mobile device 112, website information, application information, and so forth. The advertisement server processes the impression and clickstream. On processing the impression and clickstream, the advertisement server transmits the processed impression and the processed clickstream to a next advertisement server in the pipeline. In a context of the present invention, functions and capabilities of the mobile device 112 are same as the functions and the capabilities of a mobile device 114 and a mobile device 116.

In an embodiment, the plurality of the application servers 130 in the grid is used for video processing. The grid includes a plurality of the video filters. Each of the plurality of the video filters performs a processing task. The application server 132 is a denoising filter. The denoising filter receives raw video frames from the mobile device 112. The denoising filter removes the noise from the raw video frames. On removing the noise from the raw video frames, the denoising filter transmits denoised video frames to a resizing filter. The resizing filter upscales and downscales the denoised video frames. The resizing filter transmits resized video frames to a correcting filter. The correcting filter corrects attributes such as brightness, color, contrast, etc. The correcting filter transmits the corrected video to the mobile device 112. The corrected video is the processed video.

In a context of the present invention, the plurality of application servers 130 is connected to a central registry server 120. In an embodiment, the central registry server 120 includes a database to store information flowing in the pipeline. In a context of the present invention, information related to the plurality of the data packets collected by the data agents are transmitted to the central registry server 120.

In an embodiment, the application server 132 is configured to transmit the information related to the plurality of the data packets in a constant periodicity. The periodicity can be pre-determined according to a need of a Service Level Agreement (SLA).

Figure 2:
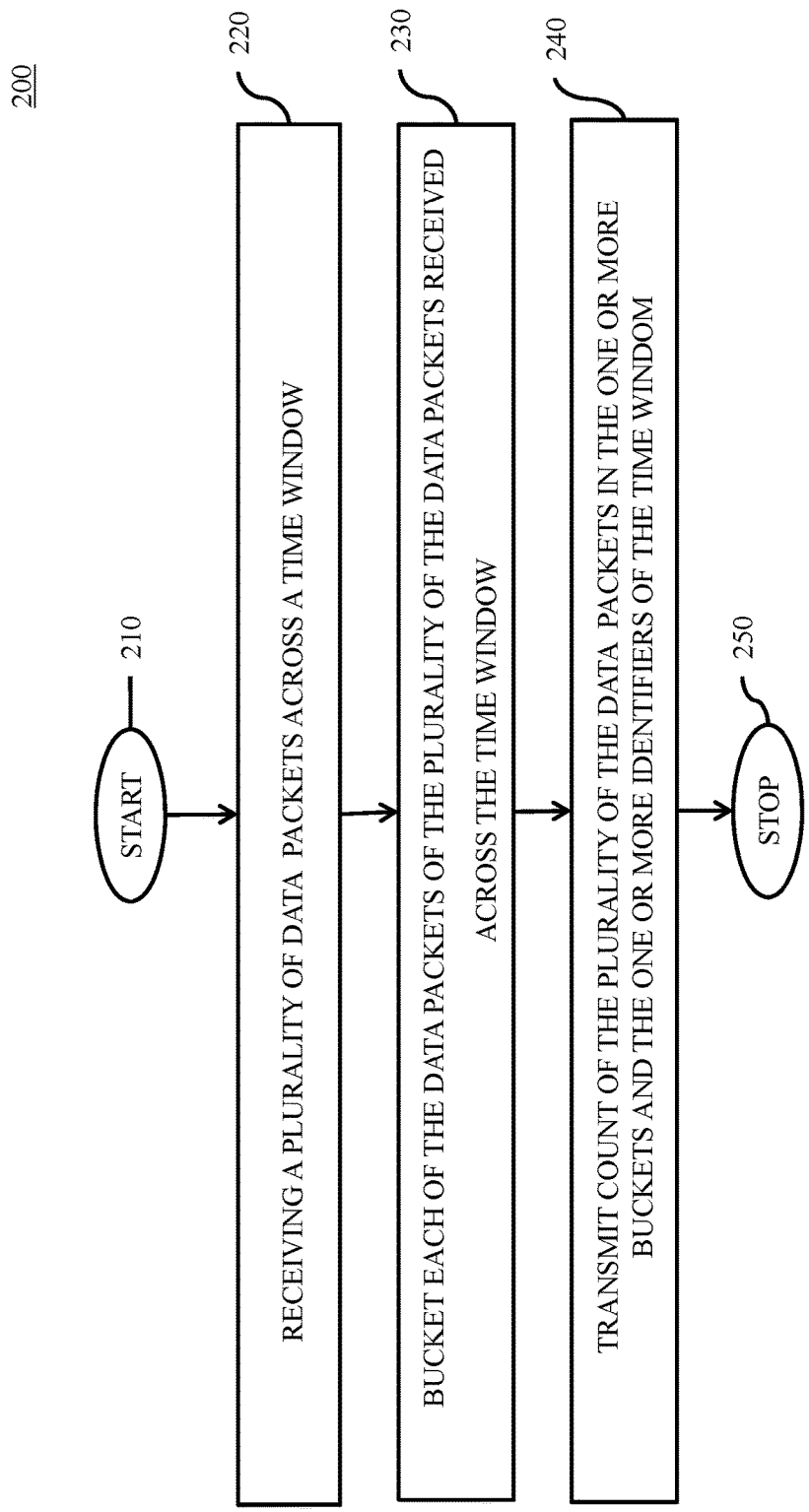
FIG. 2 illustrates a flowchart for transmitting the information related to the plurality of the data packets to calculate latency, in accordance with various embodiments of the present invention.

FIG. 2 illustrates a flowchart 200 for transmitting the information related to the plurality of the data packets to calculate latency. For the sake of explanation, the flowchart 200 is explained using the application server 132. However, the each of the plurality of the application server 130 executes the steps of the flowchart 200.

At step 210, the flowchart 200 initiates. At step 220, the application server 132 receives the plurality of the data packets across a time window. A window identifier identifies the time window. Each of the data packets of the plurality of the data packets includes a header. The header refers to supplement data placed at beginning of a block of the data packets. In an embodiment, the application server 132 includes the data agent. The data agent is coupled to the application server 132 to parse the header. The supplement data includes the time stamp at which each data packet of the plurality of the data packets originated. In an embodiment, the window identifier is the time period between receiving the plurality of the data packets by the application server 132 and the transmitting the plurality of the data packets to the application server 134.

In the embodiment mentioned above, the advertisement server receives the clickstream from the mobile device 112 in the time window. The clickstream includes additional information like the timestamp, user information, etc.

At step 230, the application server 132 buckets data packets of the plurality of data packets based on the header received across the time window. The time stamp of each of the data packet of the plurality of data packets is used to bucket the plurality of the data packets. In an example, the plurality of the data packets originated on the mobile device 132 in a time-period of 1 pm to 2 pm is grouped in a bucket. Similarly, a plurality of data packets originated on the mobile device 132 in a time-period of 2 pm to 3 pm is grouped in another bucket.

The application server 132 maintains a count of the data packets in one or more buckets. At step 240, the application server 132 transmits the count of the data packets in the one or more buckets and the window identifier to the central registry 120. In a context of the present invention, the application server 132 transmits the plurality of the data packets to the application server 134 after processing the plurality of the data packets. Accordingly, the application server 134 buckets data packets of the plurality of the data packets based on the header. On bucketing, the application server 134 transmits a count of the data packets in one or more buckets and a window identifier to the central registry server 120.

In an example, assume the following set of information about the application server 132, application server 134 and the plurality of the data packets.

| DATA PACKETS | ORIGIN TIME | APPLICATION SERVER 132 RECEIVING TIME | TRANS- MITTING TIME | APPLICATION SERVER 134 RECEIVING TIME |
|---|---|---|---|---|
| D1 | 1:00 PM | 1:10 PM | 1:20 PM | 1:30 PM |
| D2 | 1:30 PM | 1:40 PM | 2:00 PM | 2:10 PM |
| D3 | 1:40 PM | 1:45 PM | 1:55 PM | 2:15 PM |
| D4 | 2:00 PM | 2:15 PM | 2:30 PM | 2:45 PM |

As per the information provided above, application server 132 receives a data packet D1, a data packet D2, a data packet D3, and a data packet D4. The data packets originate on the mobile device 112. The origin times of the data packet D1 is 1:00 pm, the data packet D2 is 1:30 pm, the data packet D3 is 1:40 pm, and the data packet 2:00 pm. The application server 132 receives the data packet D1 at 1:10 pm, the data packet D2 at 1:40, the data packet D3 at 1:45 pm, and the data packet D4 at 2:15. The application server 132 buckets the data packets in two buckets, a bucket A and a bucket B, based on the origin time of the data packets. The bucket A includes the data packets originated between 1:00 pm to 1:30 pm. Similarly, the bucket B includes the data packets originated between 1:30 pm to 2:00 pm. On receiving the data packets, the application server 132 processes the data packets and transmits the data packets to the application server 134. The application server 132 transmits the data packet D1 at 1:20 pm, the data packet D2 at 2:00 pm, the data packet D3 at 1:55 pm, and the data packet D4 at 2:30. Additionally, the application server 132 transmits a count of the data packets in the bucket buckets A and B to central registry server 120. As per the information provided, the application server 134 receives the data packet D1 at 1:30 pm, the data packet D2 at 2:10 pm, the data packet at D3 at 2:15 pm, and the data packet 2:45 pm. Accordingly, the application server 134 buckets the data packets into the two buckets, the bucket A and the bucket B, based on the origin time of the data packets. The application server 134 transmits a count of the data packets in the bucket A and the bucket B to the central registry 120.

In an embodiment, application server 132 transmits the count of the data packets in the one or more buckets and the window identifier to the central registry server 120 in a constant periodicity. The central registry server 120 calculates latency based on the received count of the data packets in the one or more buckets and the window identifier. The calculation of latency is further discussed in a description of the FIG. 3. At step 250, the flowchart 200 terminates.

Figure 3:
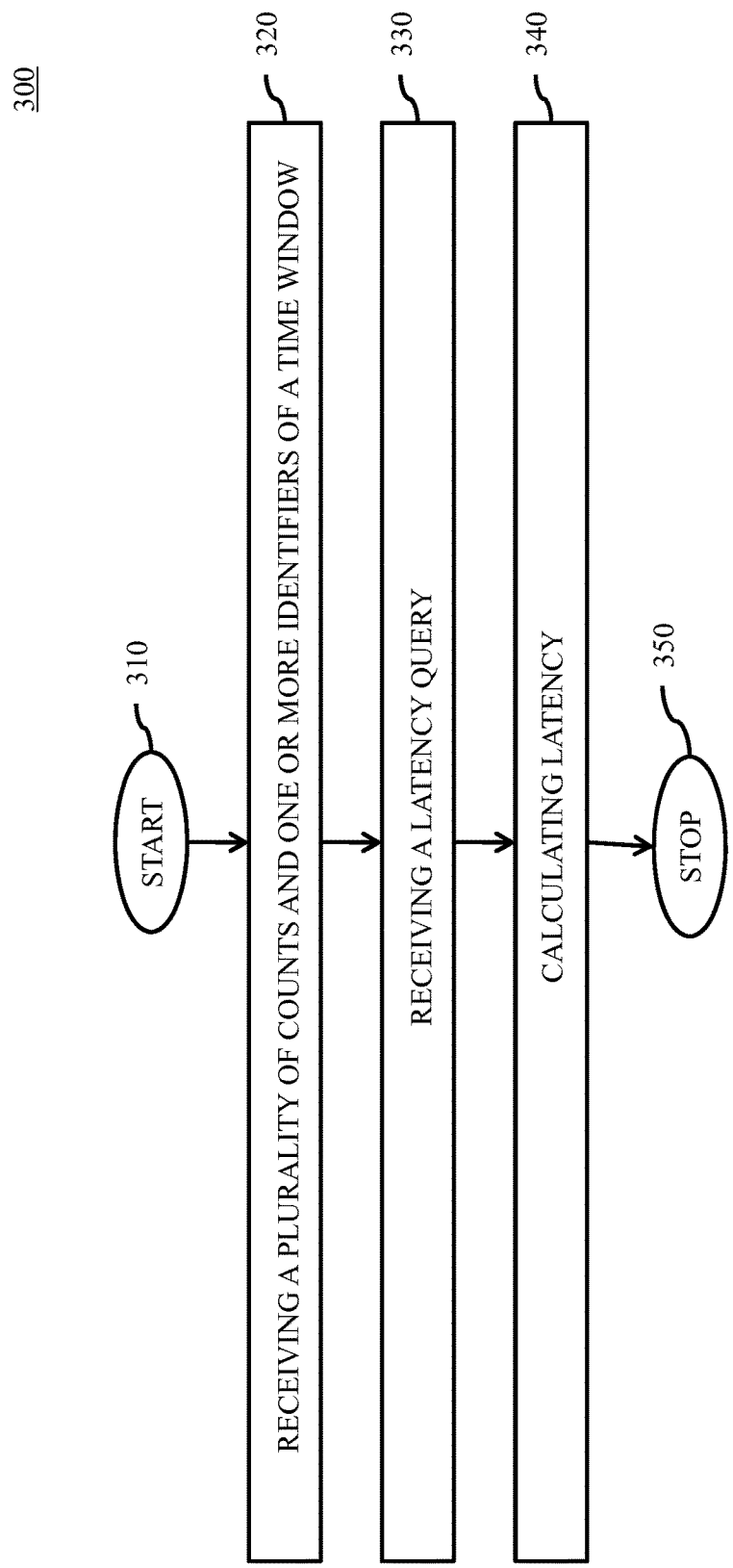
FIG. 3 illustrates a flowchart for calculating latency in the distributed data flow environment, in accordance with various embodiments of the present invention.

FIG. 3 illustrates a flowchart 300 for calculating latency in the distributed data flow environment. At step 310, the flowchart 300 initiates. At step 320, the central registry server 120 receives a plurality of counts of the data packets in the one or more buckets from the plurality of the application servers 130 in the pipeline. Additionally, the central registry server 120 receives a plurality of window identifiers from the plurality of the application servers 130.

At step 330, the central registry server 120 receives a latency query. In a context of the present invention, latency is calculated for the transmission of the plurality of data packets in the pipeline between the plurality of the application servers 130.

At step 340, the central registry server 120 calculates the latency based on the average delay based on the plurality of the counts received from the plurality of the application servers 130. In an embodiment, central registry server 120 computes the packet loss based on the plurality of the counts received from the plurality of the application servers 130.

As per the above discussed example, assume the following information about the central registry 120, the application server 132, the application server 134, the bucket A and the bucket B. The bucket A includes the data packets originating at 1 pm to 1:30 pm and the bucket B includes the data packets originating in 1:30 pm to 2 pm.

| APPLICATION SERVERS | COUNT OF DATA PACKETS IN EACH BUCKET (1 pm to 2 pm) | COUNT OF DATA PACKETS IN EACH BUCKET (2 pm to 3 pm) |
|---|---|---|
| 132 | A = 2, B = 1 | A = 0, B = 1 |
| 134 | A = 1, B = 0 | A = 1, B = 2 |

As per the information provided above, the central registry server 120 receives the count of the data packets in the bucket A and the bucket B. Additionally, the central registry server 120 receives a window identifier for a time window 1 pm to 2 pm and a window identifier for a time window 2 pm to 3 pm. The central registry server 120 receives the latency query to calculate latency across the time window 1 pm to 2 pm and the time window 2 pm to 3 pm.

The central registry server 120 receives, from the application server 132, a count of 2 data packets belonging to the bucket A and a count of 1 data packet belonging to the bucket B across the time window 1 pm to 2 pm. Moreover, the central registry server 120 receives, from the application server 134, a count of 1 data packet belonging to the bucket A and a count of 0 data packets belonging to the bucket B. Similarly, the central registry server 120 receives, from the application server 132, a count of 0 data packets belonging to the bucket A and a count of 1 data packet belonging to the bucket B across the time 2 pm to 3 pm. Furthermore, the central registry server 120 receives, from the application server 134, a count of 1 data packet belonging to the bucket A and a count of 2 data packet belonging to the bucket B.

In this example, maximum latency is calculated by weight arithmetic mean technique. The maximum time for a data packet to reach the application server 134 from the application server 132 in the 1 pm to 2 pm time window is 59 minutes for bucket A and 29 minutes for bucket B. In the time window 1 pm to 2 pm, one data packet (D1) belonging to bucket A reaches the application server 134 from the application server 132. The maximum time the 1 data packet D1 can take is 59 minutes. In the time window 2 pm to 3 pm, 1 packet (D2) from the bucket A and two packets from the bucket B reach the application server 134 from the application server 132. These two data packets from bucket B reach the applications server 132 in the time window 2 pm to 3 pm. The maximum time these two packets would have taken to reach Application server 134 is 1 hour 59 minutes. Similarly, 1 packet from the bucket A, moved from the application server 132 to the application server 134 in the time window 2 pm to 3 pm. The maximum time this packet can take is 59 minutes. Accordingly, the weight average maximum latency is calculated as: WA(Max latency)=((2×59)+(2×119))/4 minutes =89 minutes =1.19 hour.

In this example, maximum latency is calculated by weight arithmetic mean technic. Maximum time for a data packet to reach the application server 134 from the application server 132 is 1 hour. In the time window 1 pm to 2 pm, 1 data packet belonging to bucket A reaches the application server 134 from the application server 134, maximum time the 1 data packet can take is 59 minutes. In the time window 2 pm to 3 pm, 1 packet from the bucket A and 1 packet from the bucket B reaches the application server 134 from the application server 132. These two data packets reaches the applications server 132 in the time window 1 pm to 2 pm. The maximum time these two packets would have taken is 1 hour 59 minutes. Similarly, 1 packet from the bucket A, moved from the application server 132 to the application server 134 in the time window 2 pm to 3 pm. The maximum time this packet can take is 59 minute. Accordingly, the weight average maximum latency is calculated as: WA(Max latency)=((2×59)+(2×119))/4 minutes = 89 minutes = 1.19 hour.

It can be understood by one skilled in the art that although not shown, in the above example, latency can be expressed in other unit of time such as, seconds, minutes, hours, days and so forth.

At step 350, the flowchart 300 terminates.

Figure 4:
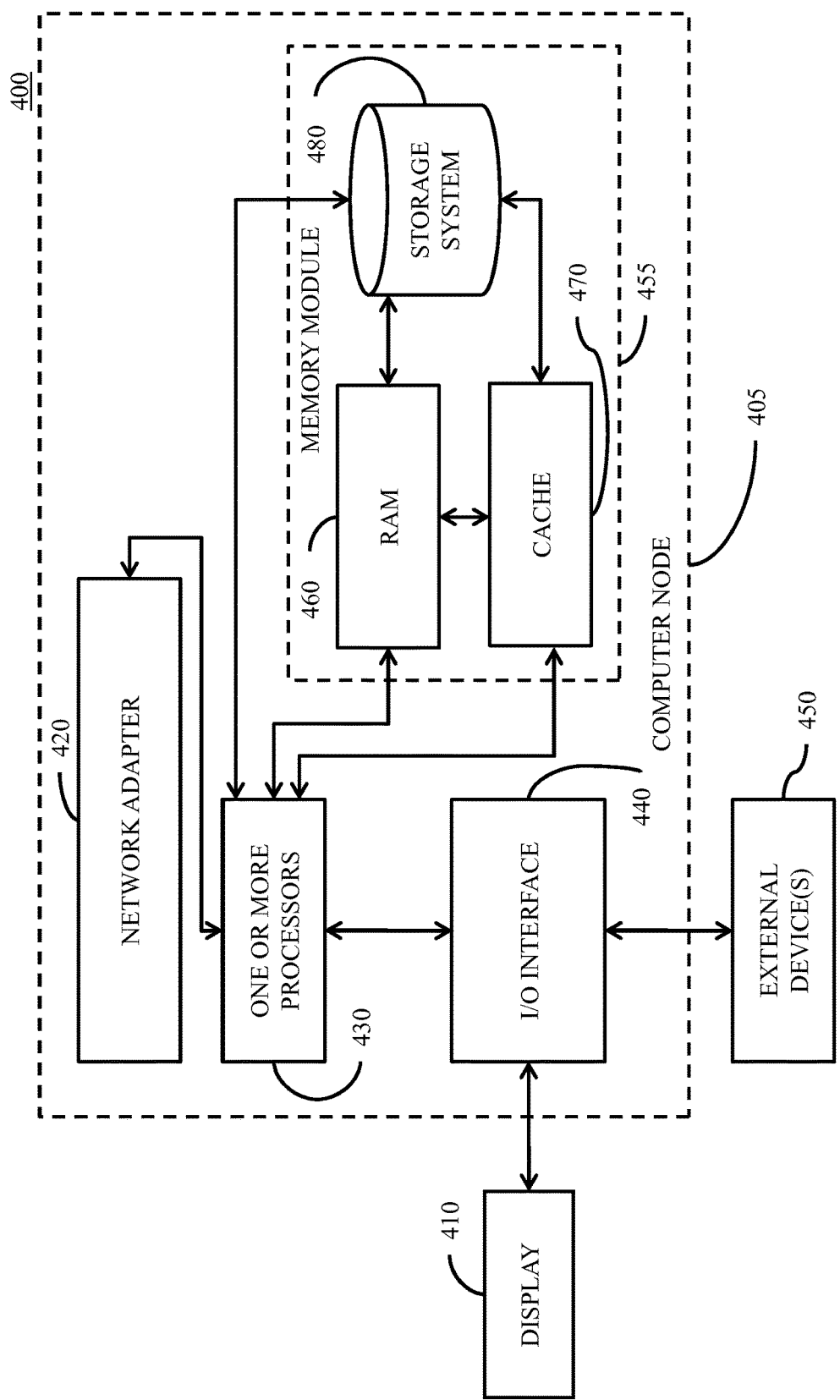
FIG. 4 illustrates a block diagram of an application server, in accordance with various embodiments of the present invention.

FIG. 4 illustrates a block diagram of an application server 400. The application server 400 is only one example of an application server and is not intended to suggest any limitation as to the scope of use or functionality of embodiments described herein. Regardless, the application server 400 is capable of implementing and/or performing any of the functionality set forth herein.

The application server 400 includes a computer server 405, which is operational with numerous other general purpose or special purpose computing system environments or configurations. Examples of well-known computing systems, environments, and/or configurations that may be suitable for use with computer server 405 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like.

In FIG. 4, the computer server 405 in the application server 400 is shown in the form of a general-purpose computing device. The components of computer server 405 include, but are not limited to; processing unit 430, a system memory 455, a network adapter 420, an input-output (I/O) interface 440 and one or more buses that couples various system components to processing unit 430.

The one or more buses represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer server 405 typically includes a variety of computer system readable media. Such media may be any available media that is accessible by computer server 405, and includes both volatile and non-volatile media, removable and non-removable media. In an embodiment, the system memory 455 includes computer system readable media in the form of volatile memory, such as random access memory (RAM) 460 and cache memory 470. Computer server 405 may further include other removable/non-removable, non-volatile computer system storage media. In an embodiment, the system memory 455 includes a storage system 480.

Computer server 405 can communicate with one or more external devices 450 and a display 410, via input-output (I/O) interfaces 440. In addition, computer server 405 can communicate with one or more networks such as a local area network (LAN), a general wide area network (WAN), and/or a public network (for example, the Internet) via the network adapter 420.

It can be understood by one skilled in the art that although not shown, other hardware and/or software components can be used in conjunction with the computer server 405. Examples, include, but are not limited to microcode, device drivers, redundant processing units, external disk drive arrays, RAID systems, tape drives, and data archival storage systems, etc.

In an embodiment, configuration and capabilities of the application server 132, the application server 134, the application server 136 and the central registry server 120 are same as configuration and capabilities of the application server 400.

As will be appreciated by one skilled in the art, aspects can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language and conventional procedural programming languages.

The present invention is useful in monitoring the overall health of distributed system. It helps to detect any bottleneck in the pipeline. Further, the present invention is useful in computing the packet loss in the distributed system. The present invention helps the system engineers in debugging a distributed system by quantifying that which hop of the system has potential issues. Furthermore, the present invention is also very useful to determine whether the SLA requirements are met or not.

In an example, the present invention is useful in reporting metrics like 99% of all packets that were generated in the mobile device, reached the final hop in 'x' minutes. Thereby, the present invention helps to fix a 99 percentile latency. The present invention is also useful in reporting a metric stating that, in the last month how many times the SLA (here the 99 percentile latency) was met or not.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for calculating latency in a distributed data flow environment, the system comprising:
   a central registry server; wherein the central registry server is configured to:
   a. receive a plurality of counts and a plurality of identifiers of time windows from a plurality of application servers, wherein the plurality of counts indicates plurality of data packets in multiple buckets, and wherein each of the buckets comprises a plurality of data packets grouped together based on a header of each of the data packet from the plurality of the data packets, wherein the header of each data packet of the plurality of data packets includes a timestamp representing a time at which each of the data packets originated and at least two of the buckets correspond to respective time windows representing different periods of time and referenced to a common originating data packet origin time;
   b. receive a latency query; and
   c. calculate latency based on the buckets and the identifier of the time windows, the referenced origin time, and the time windows for each bucket to facilitate minimizing latency in the distributed data flow environment.

2. The system of claim 1, wherein the plurality of application servers further comprises one or more data agents, each data agent of the one or more data agents is configured to parse the header of the each data packet of the plurality of data packets.

3. The system of claim 2, wherein the header of each data packet of the plurality of data packets comprises a timestamp at which the each data packet of the plurality of data packets originated.

4. The system of claim 1 further comprising:
   the plurality of application servers coupled to the central registry server, wherein each application server of the plurality of application servers is configured to:
   a. receive the plurality of data packets across the time windows, wherein each of the data packets of the plurality of data packets includes a header;
   b. bucket each of the data packets of the plurality of data packets received across the time window by the application server into multiple buckets according to the header, wherein at least two of the buckets correspond to time windows representing different periods of time and referenced to a common originating data packet origin time; and
   c. transmit at least one of the counts of the plurality of the data packets in the buckets and window identifiers associated with the time windows to the central registry server.

5. The system of claim 1, wherein to calculate latency based on the plurality of counts received by a first one of the application servers from a second one of the application servers and the plurality of window identifiers comprises to determine a weighted average of maximum latency times for each count based window identifier, the time window, and referenced sending time for each bucket.

6. The system of claim 1, wherein at least one of the application servers is an advertisement server.

7. A method of calculating latency in a distributed data flow environment, the method comprising:
   a. receiving a plurality of counts and a plurality of identifiers of time windows from a plurality of application servers, wherein the plurality of counts indicates plurality of data packets in multiple buckets, and wherein each of the buckets comprises a plurality of data packets grouped together based on a header of each of the data packet from the plurality of the data packets, wherein the header of each data packet of the plurality of data packets includes a timestamp representing a time at which each of the data packets originated and at least two of the buckets correspond to respective time windows representing different periods of time and referenced to a common originating data packet origin time;

b. receiving a latency query; and c. calculating latency based on the buckets and the identifier of the time windows, the referenced origin time, and the time windows for each bucket to facilitate minimizing latency in the distributed data flow environment.

8. The method of claim 7, wherein the header of each data packet of the plurality of data packets comprises a timestamp at which the each data packet of the plurality of data packets originated.

9. The method of claim 7, wherein calculating latency based on the plurality of counts received by a first one of the application servers from a second one of the application servers and the plurality of window identifiers comprises to determine a weighted average of maximum latency times for each count based window identifier, the time window, and referenced sending time for each bucket.

10. The method of claim 7, wherein at least one of the application servers is an advertisement server.

11. The method of claim 7, wherein the plurality of application servers further comprises one or more data agents, each data agent of the one or more data agents is configured to parse the header of the each data packet of the plurality of data packets.

12. The method of claim 7 further comprising:

receiving the plurality of data packets across the time windows, wherein each of the data packets of the plurality of data packets includes a header;

bucketing each of the data packets of the plurality of data packets received across the time window by the application server into multiple buckets according to the header, wherein at least two of the buckets correspond to time windows representing different periods of time and referenced to a common originating data packet origin time; and transmitting at least one of the counts of the plurality of the data packets in the buckets and window identifiers associated with the time windows to the central registry server.

13. One or more non-transitory, computer program products, wherein at least one of the non-transitory, computer program products comprises a first program stored therein and executable by a processor to:

receive a plurality of counts and a plurality of identifiers of time windows from a plurality of application servers, wherein the plurality of counts indicates plurality of data packets in multiple buckets, and wherein each of the buckets comprises a plurality of data packets grouped together based on a header of each of the data packet from the plurality of the data packets, wherein the header of each data packet of the plurality of data packets includes a timestamp representing a time at which each of the data packets originated and at least two of the buckets correspond to respective time windows representing different periods of time and referenced to a common originating data packet origin time;

receive a latency query; and calculate latency based on the buckets and the identifier of the time windows, the referenced origin time, and the time windows for each bucket to facilitate minimizing latency in the distributed data flow environment.

14. The one or more non-transitory, computer program products of claim 13, wherein at least one of the non-transitory, computer program products comprises a second program stored therein and executable by a processor to:

receive the plurality of data packets across the time windows, wherein each of the data packets of the plurality of data packets includes a header;

bucket each of the data packets of the plurality of data packets received across the time window by the application server into multiple buckets according to the header, wherein at least two of the buckets correspond to time windows representing different periods of time and referenced to a common originating data packet origin time; and transmit at least one of the counts of the plurality of the data packets in the buckets and window identifiers associated with the time windows to a central registry server.

15. The one or more non-transitory, computer program products of claim 13, wherein the header of each data packet of the plurality of data packets comprises a timestamp at which the each data packet of the plurality of data packets originated.

16. The one or more non-transitory, computer program products of claim 13, wherein to calculate latency based on the plurality of counts received by a first one of the application servers from a second one of the application servers and the plurality of window identifiers comprises to determine a weighted average of maximum latency times for each count based window identifier, the time window, and referenced sending time for each bucket.

17. The one or more non-transitory, computer program products of claim 13, are installed in a data flow environment, and the data flow environment comprises multiple application servers coupled together, and at least one of the application servers is an advertisement server.

18. The one or more non-transitory, computer program products of claim 17, wherein the plurality of application servers further comprises one or more data agents, each data agent of the one or more data agents is configured to parse the header of the each data packet of the plurality of data packets.

* * * * *